United States Patent

Micali et al.

(10) Patent No.: US 10,114,464 B2
(45) Date of Patent: Oct. 30, 2018

(54) DEVICE AND METHOD FOR DETERMINATION OF ANGULAR POSITION IN THREE-DIMENSIONAL SPACE, AND CORRESPONDING ELECTRONIC APPARATUS

(71) Applicant: STMICROELECTRONICS S.R.L., Agrate Brianza (IT)

(72) Inventors: Antonio Micali, Arcore (IT); Alberto Zancanato, Busto Garolfo (IT); Federico Rizzardini, Settimo Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 41 days.

(21) Appl. No.: 14/974,630

(22) Filed: Dec. 18, 2015

(65) Prior Publication Data

US 2017/0003751 A1 Jan. 5, 2017

(30) Foreign Application Priority Data

Jun. 30, 2015 (IT) .................... 102015000029090

(51) Int. Cl.
*G09G 5/00* (2006.01)
*G01P 15/00* (2006.01)
(Continued)

(52) U.S. Cl.
CPC .............. *G06F 3/017* (2013.01); *G01B 7/30* (2013.01); *G01C 17/38* (2013.01); *G01C 19/00* (2013.01);
(Continued)

(58) Field of Classification Search
CPC ........ G01B 7/30; G01C 21/10; G01C 21/165; G01C 17/38; G01C 19/00; G06F 3/017
See application file for complete search history.

(56) References Cited

U.S. PATENT DOCUMENTS

2002/0103610 A1  8/2002  Bachmann et al.
2011/0178707 A1*  7/2011  Sachs ..................... G01C 17/38
                                                                 701/472
(Continued)

FOREIGN PATENT DOCUMENTS

WO       2009/077976 A2     6/2009
WO   WO2009077976 A2 *     6/2009   ............. G01C 17/28

OTHER PUBLICATIONS

Markley et al., "Quaternion Averaging," *Journal of Guidance Control and Dynamics* 30(4):1193-1197, 2007. (10 pages).
(Continued)

*Primary Examiner* — Kwin Xie
(74) *Attorney, Agent, or Firm* — Seed IP Law Group LLP

(57) ABSTRACT

An electronic device determines an estimate ($\hat{q}$) of angular position as a function of an accelerometric signal (acc) supplied by an accelerometric sensor and as a function of at least one between a gyroscopic signal (gyro) supplied by a gyroscopic sensor and a magnetic signal (mag) supplied by a magnetic-field sensor. A processing module implements a complementary filter, which is provided with a first processing block, a second processing block, and a combination block. The first processing block receives the acceleration signal (acc) and an input signal (mag') indicative of the magnetic signal (mag) and generates a geomagnetic quaternion (qAccMag). The second processing block receives a signal indicative of the gyroscopic signal (gyro) and generates a gyroscopic quaternion (qGyro). The combination block determines the estimate ($\hat{q}$) of angular position by complementarily combining the geomagnetic quaternion (qAccMag) and the gyroscopic quaternion (qGyro) based on a combination factor (K) that has a dynamic value and an adaptive value and that varies as a function of the operating conditions.

17 Claims, 5 Drawing Sheets

(51) Int. Cl.
*G01C 17/00* (2006.01)
*G01C 19/00* (2013.01)
*G06F 3/01* (2006.01)
*G01B 7/30* (2006.01)
*G01V 3/08* (2006.01)
*G01C 17/38* (2006.01)
*G01C 21/10* (2006.01)
*G01C 21/16* (2006.01)
*G01C 9/00* (2006.01)

(52) U.S. Cl.
CPC ........... *G01C 21/10* (2013.01); *G01C 21/165* (2013.01); *G01P 15/00* (2013.01); *G01V 3/081* (2013.01)

(56) References Cited

U.S. PATENT DOCUMENTS

2013/0106697 A1  5/2013  Kulik
2014/0081592 A1*  3/2014  Bellusci ............. G01R 33/0064 702/141
2014/0278183 A1*  9/2014  Zheng ..................... G01P 21/00 702/96
2014/0337960 A1*  11/2014  Phegade ................. G06F 21/42 726/10
2015/0033821 A1*  2/2015  Mangano ............. G01C 25/005 73/1.77

OTHER PUBLICATIONS

Italian Search Report and Written Opinion, dated Jun. 30, 2015, for IT Application No. ITUB20151779, 8 pages.

Trawny, N. et al., "Indirect Kalman Filter for 3D Attitude Estimation: A Tutorial for Quaternion Algebra," Multiple Autonomous Robotic Systems Laboratory, Technical Report No. 2005-002, Rev. 57, Mar. 2005, 25 pages. http://www/cs.umn.edu/%7Etrawny.

* cited by examiner

DEVICE AND METHOD FOR DETERMINATION OF ANGULAR POSITION IN THREE-DIMENSIONAL SPACE, AND CORRESPONDING ELECTRONIC APPARATUS

BACKGROUND

Technical Field

The present invention relates to a device and to a method for determining the angular position or orientation in three-dimensional space, and to a corresponding electronic apparatus.

Description of the Related Art

As is known, there are several systems in which detection of the angular position or orientation (the so-called "attitude" and "heading") of a device in space is required, for example in portable or wearable electronic apparatuses, for inertial navigation applications, for providing user interfaces, in automotive systems, in robotic systems, and so forth.

For this purpose, inertial sensors are used, in particular accelerometers, gyroscopes, and magnetometers, as well as appropriate processing devices, which process the information detected by the inertial sensors in order to determine the angular orientation.

Known devices in general envisage use of recursive Kalman filters, built entirely via software, or with some hardware parts. However, these solutions involve a high computational cost for computing an estimate of the angular position with a desired precision, in particular in the case where a good tolerance is required to interference (such as, for example, linear accelerations or magnetic anomalies), which could cause even significant variations of the estimate made.

Moreover, the need is felt, in particular in the field of portable or wearable electronic apparatuses, to reduce electric power consumption and memory size (flash and RAM), and at the same time to increase, or at least not degrade, performance. This need evidently clashes with the high demand for resources of the solutions normally used for angular position estimation.

The subject matter discussed in the Background section is not necessarily prior art and should not be assumed to be prior art merely as a result of its discussion in the Background section. Along these lines, the recognition of one or more problems in the prior art discussed in the Background section and the subject matter associated therewith should not be treated as prior art unless expressly stated to be prior art. Instead, the discussion in the Background section encompassing one or more recognized problems in the prior art should be treated as part of the inventor's approach to the particular problem, which in and of itself may also be inventive.

BRIEF SUMMARY

Embodiments of the present disclosure meet the aforesaid need, and in particular provide a solution for determining the angular position in three-dimensional space, that will consume limited resources and will be robust in regard to the external interference, such as for example linear accelerations or interference of a magnetic nature.

According to the present disclosure, device and method embodiments for determining the angular position are consequently provided in the annexed claims.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. Said embodiments are now described purely by way of non-limiting example and with reference to the attached drawings, wherein.

DETAILED DESCRIPTION

Figure 1:
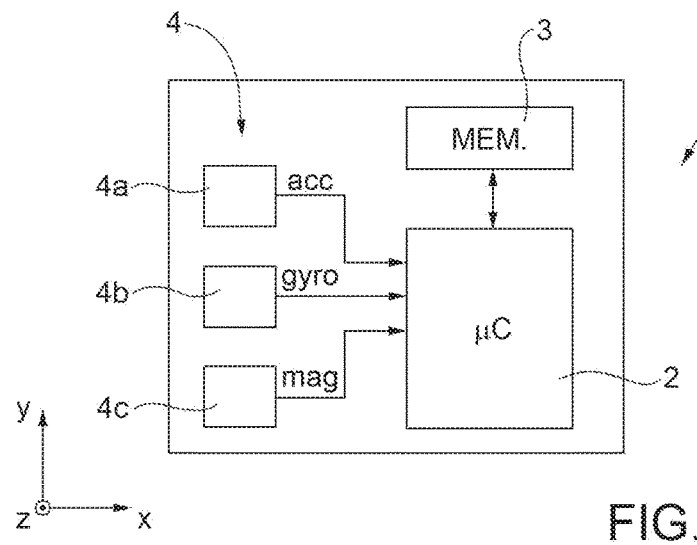
FIG. 1 is a general block diagram of an electronic device for determining angular position, according to one embodiment of the present solution.

As illustrated in FIG. 1, one embodiment of the present solution refers to an electronic device 1, which comprises a processing unit 2, for example including a microcontroller (µC), a microprocessor, a DSP (Digital Signal Processor), an FPGA (Field-Gate Programmable Array), or similar computing unit, provided with a memory 3, of a non-volatile type, which stores appropriate software instructions (firmware) that are executed by the processing unit 2.

The electronic device 1 further comprises a number of inertial sensors 4 (in the example three), among which: an accelerometer 4a, of a triaxial type, which supplies an accelerometric signal acc[x, y, z] indicative of the accelerations acting in the electronic device 1 along the three axes X, Y, Z of an inertial reference system associated to the same system; a gyroscope 4b, which is also of a triaxial type and supplies a gyroscopic signal gyro[x, y, z] indicative of the angular velocities about the three axes X, Y, Z; and a magnetometer 4c, which is also of a triaxial type and supplies a magnetic signal mag[x, y, x] indicative of the magnetic field measured along the three axes X, Y, Z.

By convention, in the following discussion, the axes of the inertial sensors 4 and the quaternions used follow the "NED" (North East Down) orientation: this type of orientation envisages that axis X points North, axis Y points East, and axis Z points upwards.

The processing unit 2 is coupled to the inertial sensors 4 and receives at input the accelerometric signal acc[x, y, z], the gyroscopic signal gyro[x, y, z], and the magnetic signal mag[x, y, x] detected by the same inertial sensors 4, and processes them jointly in order to determine an estimate $\hat{q}$ of the angular position of the electronic device 1 in three-dimensional space (in particular, with respect to set of three axes fixed with respect to the NED reference system).

As will be described in detail hereinafter, the processing unit 2 is configured to determine the estimate $\hat{q}$ on the basis of a combination of two or more of the aforesaid signals, and in particular for:

determining the estimate q̂ on the basis of the three signals, the accelerometric signal acc[x, y, z], the gyroscopic signal gyro[x, y, z], and the magnetic signal mag[x, y, x], in this case obtaining the estimate of the so-called "rotation vector";

determining the estimate q̂ on the basis of the two signals, the accelerometric signal acc[x, y, z] and the gyroscopic signal gyro[x, y, z], in this case obtaining the estimate of the so-called "game rotation vector"; and determining the estimate q̂ on the basis of the two signals, the accelerometric signal acc[x, y, z] and the magnetic signal mag[x, y, x], in this case obtaining the estimate of the so-called "geomagnetic vector".

According to one aspect of the present solution and as will be discussed in detail hereinafter, the processing unit 2 is advantageously configured to determine the aforesaid different estimates using a same computing algorithm and a same methodology for processing the input signals.

Figure 2A:
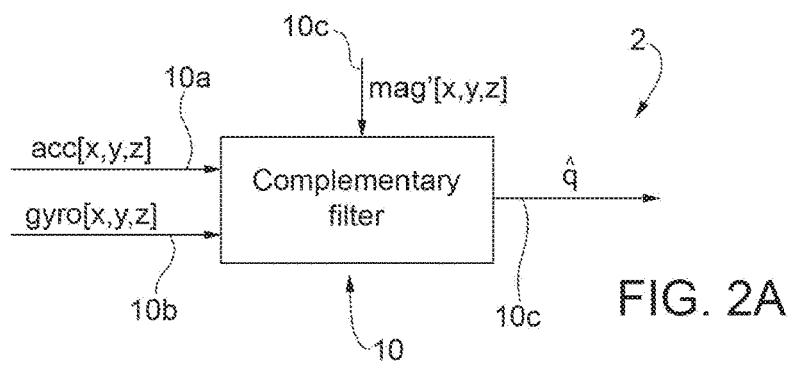
FIG. 2A is a general block diagram of a processing module in the device of FIG. 1, in a possible embodiment.

In greater detail (as illustrated in FIG. 2A), the processing unit 2 comprises a recursive-filter module, which is configured to implement a complementary filter and for this reason is referred to in what follows as "complementary-filter module" 10.

In a possible embodiment, the complementary-filter module 10 has: a first input 10a, which receives the accelerometric signal acc[x, y, z] from the accelerometer 4a; a second input 10b, which receives the gyroscopic signal gyro[x, y, z] from the gyroscope 4b; a third input 10c, which receives a processed magnetic signal mag'[x, y, z] that is a function of the magnetic signal mag[x, y, z] supplied by the magnetometer 4c (as described more fully in what follows); and an output 10d, which supplies the estimate q̂ of the angular position.

In a digital embodiment, the signals acc[x, y, z], gyro[x, y, z], and mag'[x, y, z] refer to a same sampling instant t.

Figure 2B:
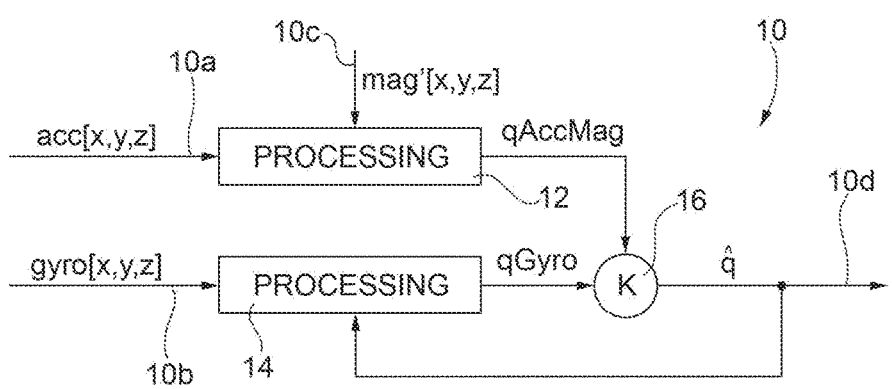
FIG. 2B is a more detailed block diagram of the processing module of FIG. 2A.

As illustrated in greater detail in FIG. 2B, in a possible embodiment, the complementary-filter module 10 comprises:

a first processing block 12, which receives at input the accelerometric signal acc[x, y, z] and the processed magnetic signal mag'[x, y, z], and processes the same signals jointly for supplying at output an instantaneous geomagnetic quaternion qAccMag;

a second processing block 14, which receives at input the gyroscopic signal gyro[x, y, z] and the estimate q̂ (as a feedback from the output of the complementary-filter module 10, obtained, that is, at the previous processing instant t−1), processes them jointly, and supplies at output a gyroscopic quaternion qGyro, indicative of the instantaneous rotation of the electronic device 1; and a complementary combination block 16, which receives on a first combination input the geomagnetic quaternion qAccMag and on a second combination input the gyroscopic quaternion qGyro, and supplies, on a combination output, the estimate q̂ on the basis of a combination factor K having a dynamic and adaptive value, which varies as a function of the operating conditions (as described more fully hereinafter).

According to one aspect of the present solution, the geomagnetic quaternion qAccMag, the gyroscopic quaternion qGyro, and the estimate q̂ are expressed according to the quaternion algebra. In particular, the estimate q̂ represents the angular position expressed as a quaternion, having the following components:

$q_0$, component for the axis x;
$q_1$, component for the axis y;
$q_2$, component for the axis z;
$q_3$, weight component, given by $$q_3 = 1 - \sqrt{q_0^2 + q_1^2 + q_2^2}$$

In general, operation of the complementary-filter module 10 envisages combining in a recursive way the data at output from the inertial sensors, namely, the accelerometer 4a, the gyroscope 4b, and/or the magnetometer 4c, in order to compensate for the defects proper to each sensor used by itself (so as to improve the precision of the resulting estimate).

The first processing block 12 operates so as to "pack" the data supplied by the accelerometer 4a and magnetometer 4c in a geomagnetic rotation matrix, which is subsequently converted into a quaternion (qAccMag); the second processing block 14 processes the data at output from the gyroscope 4b, supplying the corresponding quaternion (qGyro) starting from the last valid estimate q̂; and the quaternions are then combined through the complementary filter 10.

In greater detail, the first processing block 12, using vector products, calculates a base-change matrix for change of base between the reference system fixed with respect to the inertial sensors 4a-4c and an absolute reference system, which in the example follows the NED convention, by the following passages:

calculation of the vector Down by normalizing the data at output from the accelerometer 4a;

calculation of a vector North' (corresponding to the Earth's North) by normalizing the data at output from the magnetometer 4c;

calculation of the vector East by applying the vector product East=Down×North';

normalization of the vector East; and calculation of the vector North by applying the vector product North=East×Down.

Then, the three orthonormal unit vectors north[x, y, z], east[x, y, z], and down[x, y, z], and the base-change matrix B $$B = \begin{bmatrix} north_x & east_x & down_x \\ north_y & east_y & down_y \\ north_z & east_z & down_z \end{bmatrix}$$

are calculated at each instant.

Once the above base-change matrix B has been computed, it is possible to convert it into the unit-quaternion domain so as to obtain a structure that is lighter and may be more easily combined with other data. The geomagnetic quaternion qAccMag is the non-filtered quaternion at output from the first processing block 12, which represents the punctual geomagnetic quaternion, instant by instant.

The second processing block 14 converts the instantaneous input data into a quaternion that indicates the instantaneous rotation, which is added, in feedback, to the filtered rotation estimated in the previous step (estimate q̂), which is the best estimate of the angular positioning of the electronic device 1 in three-dimensional space.

In detail, the second processing block 14 carries out the following operations:

calculation of the modulus ω of the gyroscopic signal gyro[x, y, z] at output from the gyroscope 4b;

normalization of the values at output from the gyroscope 4b to obtain the components $\omega_x$, $\omega_y$, $\omega_z$; and construction of a punctual quaternion qDeltaGyro.

Construction of the punctual quaternion qDeltaGyro is performed via the following passages:

calculation of the rotation modulus as $\theta=\omega \cdot dT$ by integrating the modulus from the gyroscope 4b, where dT is the time that has elapsed between two successive measurements made by the gyroscope 4b; and calculation of the components $q_0 = \cos(\theta/2);$ $q_1 = \sin(\theta/2) \cdot \omega_x;$ $q_2 = \sin(\theta/2) \cdot \omega_y;$ $q_3 = \sin(\theta/2) \cdot \omega_z.$ Once the punctual quaternion qDeltaGyro has been calculated, the quaternion representing the total rotation qGyro is then calculated as:

qGyro = qEst ⊗ qDeltaGyro (the sum of the rotations is obtained as multiplication between the quaternions).

It should be noted that, if $\hat{q}$ has not yet been calculated, the first operation for defining qGyro is qGyro = qAccMag, i.e., the initial rotation for setting qGyro in the right absolute angular position is initially provided by the non-filtered geomagnetic quaternion qAccMag.

Operation of the complementary combination block 16 is now discussed in greater detail.

In a per se known manner, a complementary filter is based on the combination of a low-pass filtering and a high-pass filtering, operating so that the signal at output is better than the signals at input. This type of filtering is used when one of the two components at input will benefit from a low-pass filtering for removing noise and for preserving the DC component, whereas the other component at input will benefit from a high-pass filtering.

In this case, it has been realized that use of the complementary filter is particularly indicated for combining the geomagnetic quaternion qAccMag, which is low-pass filtered, and the gyroscopic quaternion qGyro, which is high-pass filtered (for example, for removal of drift).

According to an aspect of the present solution, the complementary filter 10 is applied directly to the quaternions, without changing form of representation. For this purpose, for example, the instrument of weighted average between quaternions may be applied (which is per se known and not described in detail herein; further theoretical information in this regard may in any case be found in the paper "Averaging Quaternions", by F. Landis Markley, Yang Cheng, John L. Crassidis, Yaakov Oshman, Journal of Guidance Control and Dynamics, vol. 30, no. 4, pp. 1193-1197, 2007).

In general, the filtering operation implemented by the complementary combination block 16 may be schematically and conceptually expressed as $\hat{q} = K \cdot qGyro + (1-K) \cdot qAccMag$ where the combination factor K has a value close to 1: $K \cong 1$; for example, K is comprised in a range from 0.95 to 0.9999.

It should be noted that the aforesaid formula, as mentioned, is a schematic definition of complementary filtering. In a way that will be evident to the person skilled in the field, and as described in the aforesaid paper, in quaternion algebra, this formula may be expressed as:

$$q = \pm \frac{[w_1 - w_2 + z]q_1 + 2w_2(q_1^* q_2)q_2}{|[w_1 - w_2 + z]q_1 + 2w_2(q_1^* q_2)q_2|}$$

which represents a weighted average between quaternions $q_1$, $q_2$, where $z=\sqrt{(w_1-w_2)^2 + 4w_1 w_2 (q_1^* q_2)^2}$, and $w_i$ are the weights associated to the components of the quaternion.

In what follows, the schematic representation appearing above will be used for simplicity of exposition.

According to a further aspect of the present solution, the combination factor K has a value that varies dynamically as a function of a first variability parameter AL, which is indicative of linear accelerations acting on the electronic device 1, and of a second variability parameter VC, which is indicative of a rate of convergence with which the estimate $\hat{q}$ recursively reaches the effective value of angular position, according to the following expression:

$K = f(AL, VC) = K_0 + AL + VC$ where $K_0$ is an appropriate initial value close to 1, for example equal to 0.99 ($K_0$ may for example be comprised in the range from 0.95 to 1).

In particular, the role of the first variability parameter AL is that of countering the linear accelerations, by weighting to a greater extent the contribution of the gyroscopic quaternion qGyro as compared to that of the geomagnetic quaternion qAccMag in the presence of linear accelerations.

The first variability parameter AL is defined as a linear increase starting from a starting value, equal to 0, up to a pre-set maximum value (in a range from 0 to $1-K_0$) so that at output the combination factor K may even reach the value 1 for very high linear accelerations.

The function with which the first variability parameter AL is determined is linear between these, minimum and maximum, end-point values and depends linearly on the modulus of the linear acceleration estimated in a punctual way, according to the expression $AL = \text{abs}(acc_{norm} - \text{grav}),$ i.e., it is equal to the absolute value of the modulus of the accelerometric signal acc[x, y, z] from which the estimated acceleration of gravity gray is subtracted.

The result of the above expression for values smaller or greater than the two end-point values indicated previously is saturated at the pre-set minimum value or maximum value.

In this way, it is possible to obtain a desired compensation of the linear accelerations in so far as, if need be, the combination factor K is increased and is then brought back to the starting value in normal conditions (i.e., in the absence of linear accelerations).

The choice of getting the combination factor K to start from an initial value $K_0$ lower than the one applied for filtering the external linear accelerations derives from the fact that the convergence with respect to the true angles of rotation is in some conditions a result of using the information deriving from the accelerometric sensor 4a and the magnetometric sensor 4c in so far as the gyroscope 4b does not supply an output that is always reliable over time (on account of the drift effect).

The initial value $K_0$ further has an appropriate value that desirably leads to convergence in any operating condition.

There are, however, some cases in which it is desirable to vary the rate of convergence so as to produce a faster, as well as more accurate, response, for example when the presence of a high error on the estimate $\hat{q}$ is detected while the electronic device 1 is stationary.

The role of the second variability parameter VC is to increase the weight attributed to the geomagnetic quaternion qAccMag in given operating conditions, at the same time preventing conflict with the previously discussed management of the anomalies due to external linear accelerations.

In particular, the second variability parameter VC has a value comprised between 0 and a maximum negative value VC_MAX (for example, between 0 and −0.2, in particular equal to −0.1), and is for example generated by a function based on an index of movement IM of the electronic device 1 and on the difference, or error, between the gyroscopic quaternion qGyro and the geomagnetic quaternion qAccMag.

In greater detail, the index of movement IM of the electronic device 1 is a parameter depending on the data supplied by the accelerometer 4a and by the gyroscope 4b, and defines, via a value comprised between 0 and 1, how much the device may be considered stationary or in motion (the extremes 0 and 1 being indicative that the system is stationary or, respectively, is moving).

Figure 3:
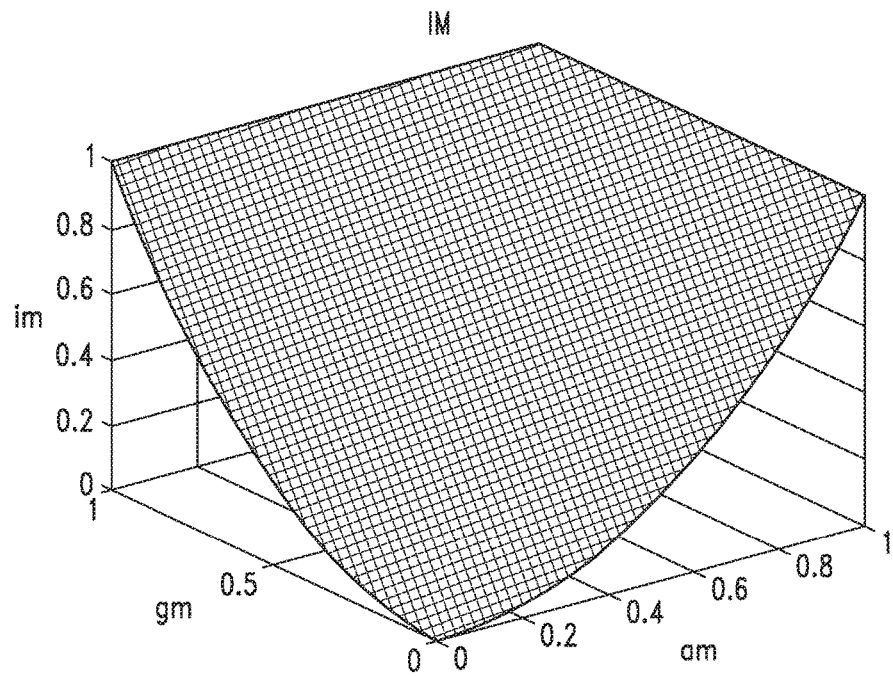
FIG. 3 is a plot of quantities processed in the processing module of FIG. 2B.

The parameters for calculation of the movement index IM are the moduli of the gyroscopic signal gyro[x, y, z] and of the accelerometric signal acc[x, y, z], which are here designated by am and gm, appropriately scaled between 0 and 1. A possible function that defines the movement index IM starting from the moduli am and gm is represented, for example, in FIG. 3.

The error between the gyroscopic quaternion qGyro and the geomagnetic quaternion qAccMag is calculated as angular difference in the quaternion domain, and is also scaled so that it is comprised between 0 and 1.

The function of these two variables (movement index IM and the aforesaid error) supplies the second variability parameter VC, in given operating conditions, appropriately attributing greater weight to the geomagnetic quaternion qAccMag as compared to the standard condition, thus leading to a higher rate of convergence.

A possible expression of the function for calculation of the variability parameter VC is the following:

$$VC = ((1-\varepsilon+\varepsilon_{min})+(IM-1))*\sigma_{vc}$$

where $\varepsilon$ is proportional to the weight component of the quaternion error calculated as $qAccMax \otimes qGyro^{-1}$, $\varepsilon_{min}$ is the minimum error tolerated in order not to activate a fast convergence and corresponds to the maximum difference between qAccMag and qGyro in static conditions (this value depends on the noise parameters of the inertial sensors 4 and, in one embodiment, has a range comprised between 0 and 0.01), and $\sigma_{vc}$ is a scale factor that varies, for example, between 0.1 and 0.5.

Figure 4:
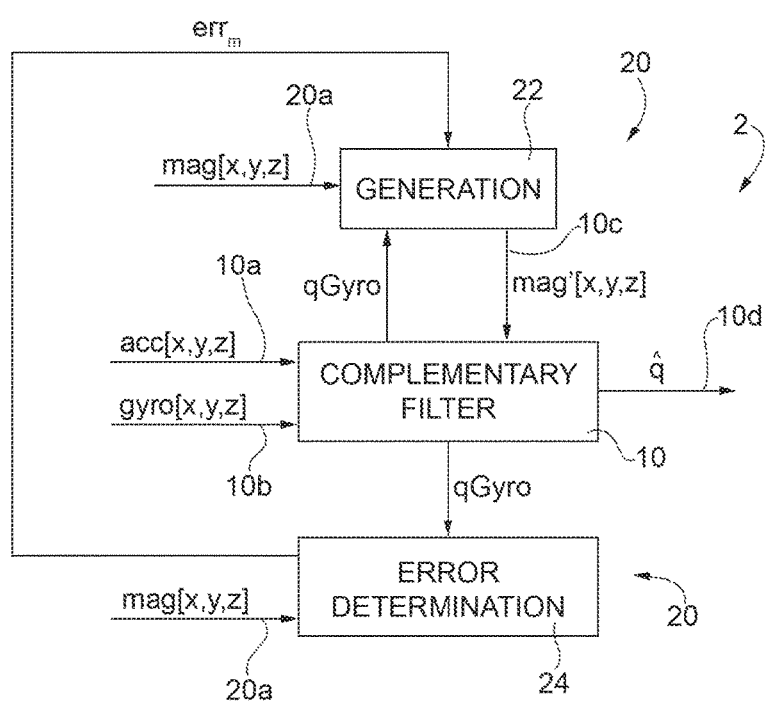
FIG. 4 is a general block diagram of the processing module in the device of FIG. 1, in a different embodiment.

One embodiment of the present solution, illustrated in FIG. 4, envisages that the processing unit 2 further comprises a magnetic-anomalies handling module 20, which co-operates, as an external infrastructure, with the complementary-filter module 10 to obtain that the estimate q̂ will be also insensitive to the presence of anomalies or magnetic interference, due to the proximity of ferromagnetic materials or magnetic fields other than the Earth's magnetic field.

The magnetic-anomalies handling module 20 is configured to generate the processed magnetic signal mag'[x, y, z] starting from the magnetic signal mag[x, y, z] supplied by the magnetic sensor 4c and received on a respective input 20a, and starting from the gyroscopic quaternion qGyro.

Furthermore, as will be discussed in detail, the magnetic-anomalies handling module 20 is configured to ensure flexibility or dynamicity of the algorithmic structure for calculation of the estimate q̂, so as to enable, with minimal and appropriate modifications and settings, the possibility of implementing the various estimation strategies referred to previously, which are designed to supply the "rotation vector", the "game rotation vector", or the "geomagnetic vector".

The magnetic-anomalies handling module 20 comprises a generation stage 22 and an error-determination stage 24.

Figure 5A:
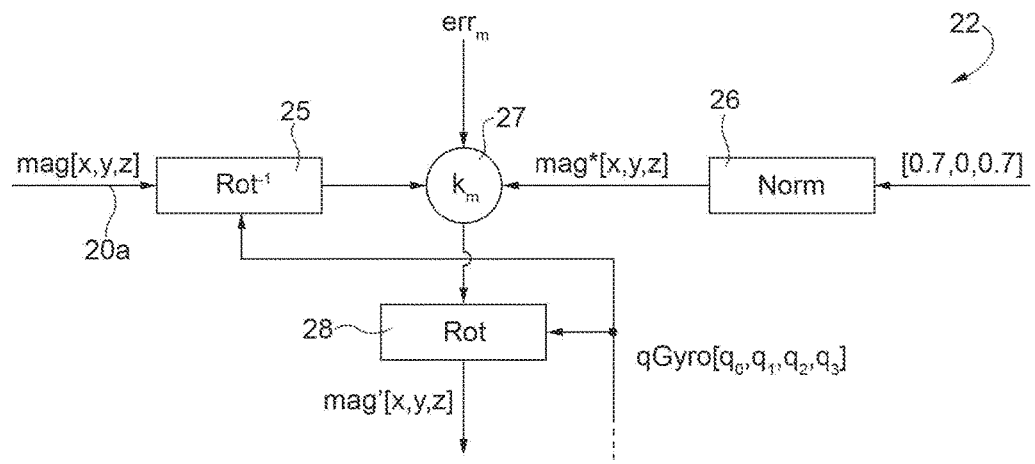
FIGS. 5A-5B, 6A-6B are more detailed block diagrams of parts of the processing module of FIG. 4.

As illustrated in detail in FIG. 5A, the generation stage 22 receives at input:

the magnetic signal mag[x, y, z] from the magnetic sensor 4c;

the gyroscopic quaternion qGyro, indicative of the instantaneous estimated rotation of the electronic device 1, from the second processing block 14 of the complementary-filter module 10; and a magnetic-error estimate coming from the error-determination module 24 and represented by an error parameter $err_m$ (as described in detail hereinafter).

The generation stage 22 comprises:

a first rotation block 25, which receives the magnetic signal mag[x, y, z] and implements a rotation $Rot^{-1}$ thereof towards the North position of the absolute NED reference system, on the basis of the gyroscopic quaternion qGyro;

a normalization block 26, which receives at input an ideal magnetic signal $mag_{id}$[x, y, z] from a hypothetical virtual magnetometer oriented to the North (according to the NED convention used, this signal may be equal to [0.7, 0, 0.7]) and normalizes the same signal making it consistent with the real magnetic signal mag[x, y, z], thus generating a normalized magnetic signal mag*[x, y, z];

a combination block 27, which receives on a first combination input the magnetic signal mag[x, y, z] rotated by the first rotation block 25 and on a second combination input the normalized magnetic signal mag*[x, y, z], and supplies, on a combination output, a magnetic combination signal, on the basis of a magnetic combination factor $k_m$, the value of which is determined dynamically as a function of the error parameter $err_m$ received from the error-determination stage 24; and a second rotation block 28, which receives the magnetic combination signal and carries out a rotation Rot thereof, opposite to the rotation carried out by the first rotation block 25 in order to return to the real position, once again based on the gyroscopic quaternion qGyro, thus obtaining the processed magnetic signal mag'[x, y, z], which is sent to the input 10c of the complementary-filter module 10.

In greater detail, the combination block 27 implements the following expressions:

$$mag'_x = (1-k_m) \cdot mag_x + k_m \cdot mag*_x$$

$$mag'_y = (1-k_m) \cdot mag_y + k_m \cdot mag*_y$$

$$mag'_z = (1-k_m) \cdot mag_z + k_m \cdot mag*_z$$

thus attributing, in the combination, a greater or smaller weight to the virtual or real magnetic signal, as a function of the value of the magnetic combination factor $k_m$.

The normalization block 26, as has been mentioned previously, has the function of making the measurements of the virtual magnetometer consistent with those of the real magnetometer. For this purpose, the following conditions are made to apply simultaneously:

$$mag*_z = mag_z$$

$$\sqrt{mag*_x{}^2 + mag*_y{}^2 + mag*_z{}^2} = 1$$

$$\Psi = \Psi*$$

where Ψ and Ψ* are the yaw of the real magnetometer and the yaw of the virtual magnetometer, respectively.

From the last equation, it is possible to obtain:

$$\frac{mag_x}{mag_y} = \frac{mag_x^*}{mag_y^*} = \alpha$$

By solving the system with the constraints applied, it is possible to conclude that:

$$mag_z^* = mag_z$$

$$mag_y^* = \sqrt{\frac{1 - mag_z^2}{1 + \alpha^2}}$$

$$mag_x^* = \alpha \cdot \sqrt{\frac{1 - mag_z^2}{1 + \alpha^2}}$$

It should be noted that the above equations apply, in so far as the magnetic signals used are considered to be normalized to unity.

Figure 5B:
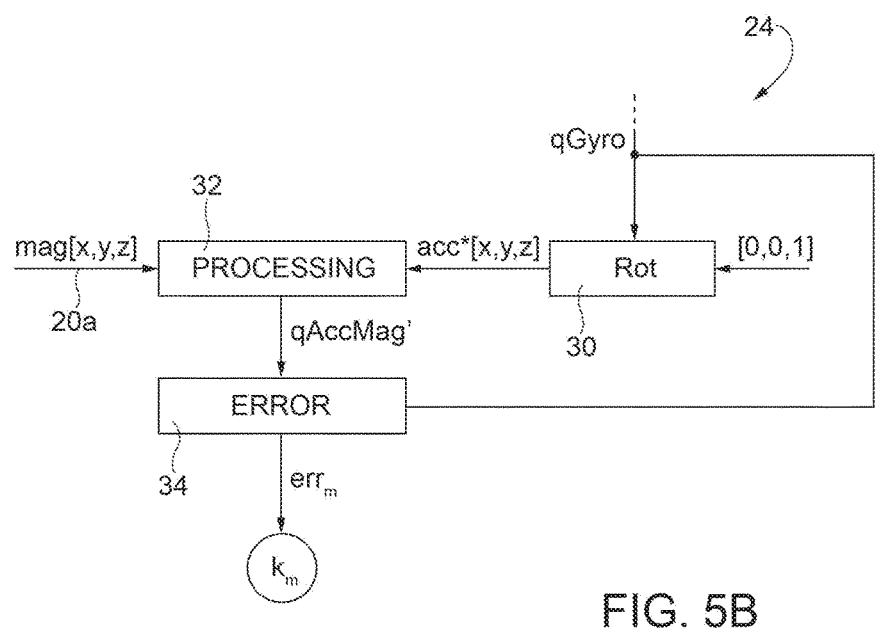

As illustrated in detail in FIG. 5B, the error-determination stage 24 receives at input the magnetic signal mag[x, y, z] from the magnetic sensor 4c and the gyroscopic quaternion qGyro, which is indicative of the instantaneous rotation of the electronic device 1, from the second processing block 14 of the complementary-filter module 10.

The error-determination stage 24 comprises:

a respective rotation block 30, which receives at input an ideal "down" acceleration unit vector [0, 0, 1] and carries out the rotation Rot thereof as a function of the gyroscopic quaternion qGyro, thus generating a gravity unit vector acc*[x, y, z];

a processing block 32 (altogether similar to the first processing block 12 of the complementary-filter module 10), which receives at input the magnetic signal mag[x, y, z] and the gravity unit vector acc*[x, y, z], processes them jointly, and supplies at output a geomagnetic gravity quaternion qAccMag', which is not affected by external accelerations, and is instead subject to magnetic anomalies; and an error-computing block 34, which receives at input the geomagnetic gravity quaternion qAccMag' and the gyroscopic quaternion qGyro, calculates a deviation quaternion qAccMax'⊗qGyro$^{-1}$, and then determines, as a function of this deviation quaternion, an error parameter err$_m$ indicative of the magnetic interference to which the electronic device 1 is subjected.

As discussed previously, the error parameter err$_m$ is used by the combination block 27 of the generation stage 22 for determining the value of the magnetic combination factor k$_m$ and appropriately combining the real magnetic signal mag [x, y, z] and the ideal normalized magnetic signal mag*[x, y, z], possibly interrupting use of the real magnetometer, replaced by the virtual one, in the presence of strong magnetic interference.

According to a further aspect of the present solution, as mentioned previously, the generation stage 22 of the magnetic-anomalies handling module 20 is further configured to bestow dynamicity and configurability on the algorithm for determination of the angular position.

In particular, it is sufficient to set in the combination block 27 a value equal to 1 for the magnetic combination factor k$_m$ in order to select entirely the information supplied by the virtual magnetometer so that the estimate q̂ at output represents the "game rotation vector"; that is, estimate q̂ is not calculated via the magnetometer 4c, but depends only on the accelerometer 4a and the gyroscope 4b.

Using, instead, a different value for the magnetic combination factor k$_m$, also the information supplied by the real magnetometer is taken into account, up to the limit case where k$_m$=0, which makes it possible to select entirely the real magnetometer.

A further option of configurability of the estimation algorithm is provided by the complementary-filter module 10, which enables, as will be now discussed in detail, implementation of the estimate q̂ as a geomagnetic quaternion (i.e., without the use of the information supplied by the gyroscope 4b).

Figure 6A:
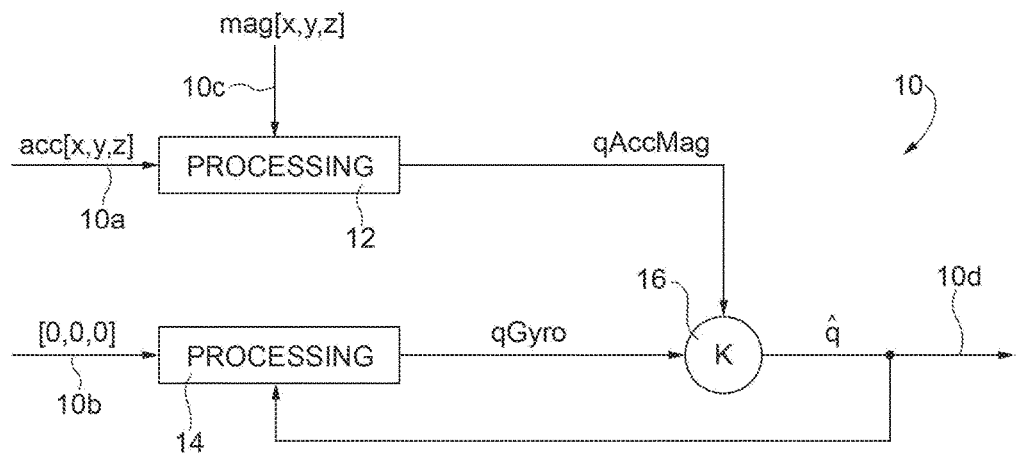

With reference to FIG. 6A, it is in fact sufficient to supply to the input 10b of the second processing block 14, instead of the gyroscopic signal gyro[x, y, z], a zero vector [0, 0, 0], thereby effectively disabling intervention of the gyroscope 4b for determination of estimate q̂.

Figure 6B:
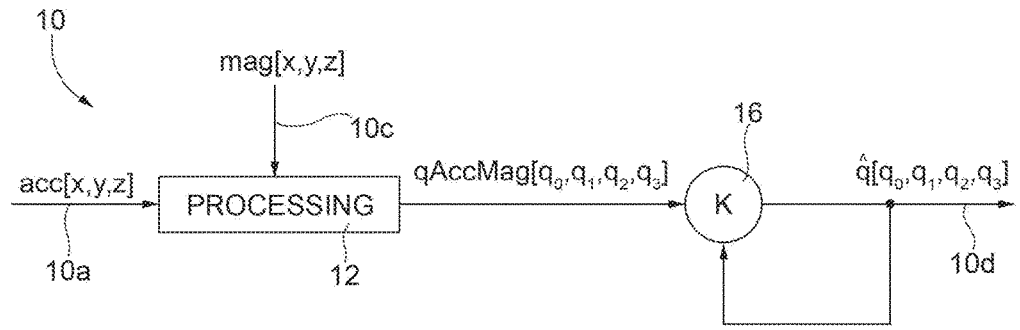

In this way, the complementary filter 10 is reduced as shown in FIG. 6B in so far as the processing block 14 simply copies q̂ into qGyro and enables filtering of the value at output from the first processing block 12 to obtain a less noisy geomagnetic quaternion qAccMag, carrying out a low-pass filtering instant by instant of the value of the same geomagnetic quaternion qAccMag (by computing the weighted average thereof with the filtered quaternion at the preceding instant, t−1).

By varying the combination coefficient K between 0 and 1 it is possible to choose, respectively, a more reactive solution or else a less noisy and smoother solution, as indicated schematically by the formula:

$$\hat{q}_t = K \cdot \hat{q}_{t-1} + (1-K) \cdot qAccMag_t$$

which, as is once again emphasized, represents ideally the operation carried out, but is actually to be replaced in an appropriate way with the expression of weighted average between quaternions discussed previously.

Figure 7:
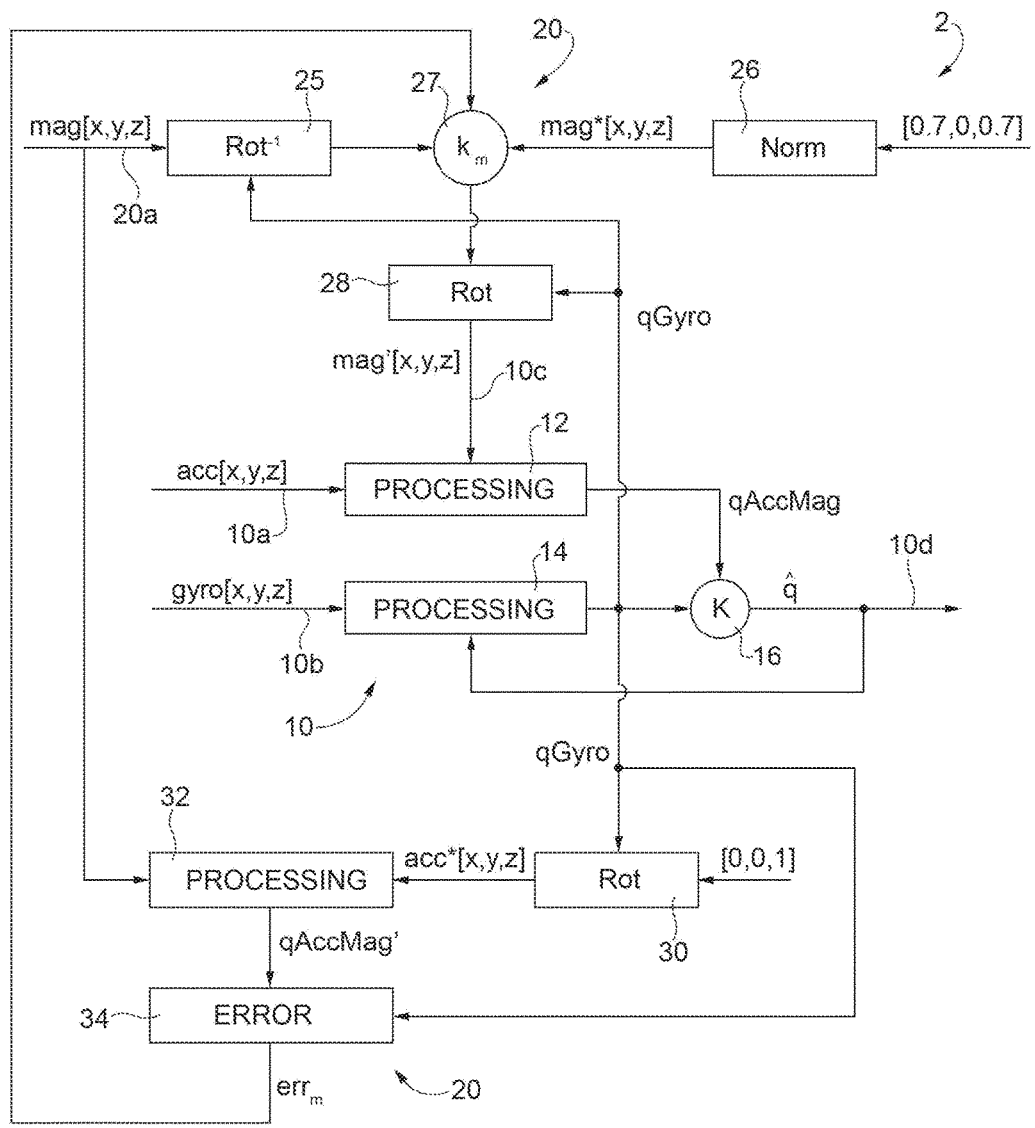
FIG. 7 is an overall block diagram of the processing module, in one embodiment.

FIG. 7 illustrates as a whole the block diagram implemented by the processing unit 2, according to the embodiment described previously.

The advantages of the solution proposed are clear from the foregoing discussion.

In any case, it is once again emphasized that the above solution enables estimation of the angular position in three-dimensional space with a high precision consuming less resources, for example as regards computational power and occupation of memory, as compared to traditional solutions based, for example, on the use of recursive Kalman filters. This solution is consequently particularly indicated for use with microcontrollers, or similar computing units, with reduced performance.

The solution described, thanks to its simplicity of implementation, further provides a limited occupation of memory and has a fast execution (with considerable reduction of the running times as compared to traditional solutions).

Furthermore, the algorithm described is configurable in a simple and fast way for supplying at output alternatively the estimate of the "rotation vector", of the "game rotation vector", or of the "geomagnetic vector", without requiring, as in traditional solutions, distinct algorithms or circuits, each dedicated to making a different estimate of the angular position.

The solution described is furthermore robust in regard to external interference, such as linear accelerations or magnetic anomalies.

Figure 8:
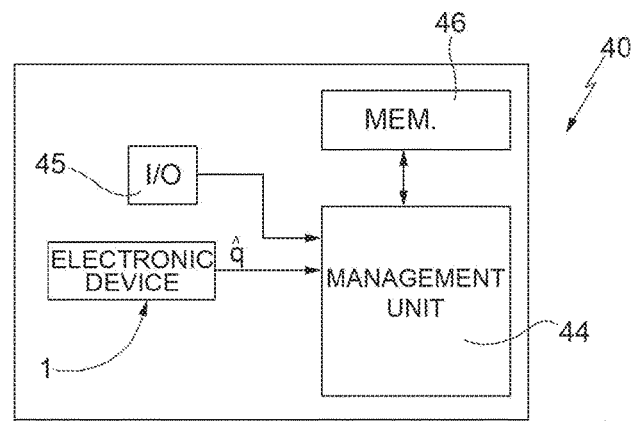
FIG. 8 is a general block diagram of an electronic apparatus incorporating the electronic device for determining angular position.

The above advantages thus render use of the electronic device 1 suitable in an electronic apparatus 40, in particular of a portable type, as illustrated schematically in FIG. 8.

The electronic apparatus 40 may be a mobile-communication portable apparatus, such as a cellphone, a smartphone, a PDA (Personal Digital Assistant), a digital audio player with voice-recording capacity, a photographic camera or video camera, a controller for videogames, etc., or a wearable apparatus, such as for example a smartwatch or an electronic bracelet; the electronic apparatus 40 is generally able to process, store, and/or transmit and receive signals and information.

The electronic apparatus 40 comprises, in addition to the electronic device 1 for determining the angular position, a management unit 44, which receives the estimate q̂ determined by the same electronic device 1 and implements appropriate actions in an input/output (I/O) interface 45, for example provided with a display, coupled to the same management unit 44. Management unit 44 is further provided with a respective nonvolatile memory 46.

Finally, it is clear that modifications and variations may be made to what is described and illustrated herein, without thereby departing from the scope of the presentdisclosure.

In particular, modifications might be envisaged in the structure of the complementary-filter module 10 and/or the magnetic-anomalies handling module 20.

For instance, for implementing rotations within the aforesaid modules, for example in the various rotation blocks 25, 28, 30, instead of the gyroscopic quaternion qGyro, the estimate q̂ could be used. However, since the estimate q̂ refers to the previous instant t−1, and not to the current instant t, the results of the recursive algorithm may generally have a lower precision (but in any case adequate for numerous applications).

Furthermore, the complementary-filter module 10 could possibly operate by receiving at input directly the magnetic signal mag[x, y, z] generated by the magnetic sensor 4c, in the absence of the external infrastructure constituted by the magnetic-anomalies handling module 20 (or with the magnetic-anomalies handling module 20 being not operative).

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic complementary filter device, comprising:
a first processing block configured to receive an acceleration signal from an accelerometric sensor, configured to receive an input signal indicative of a magnetic signal from a magnetic-field sensor, configured to generate a geomagnetic quaternion, configured to gyroscopically adjust said input signal indicative of the magnetic signal via a first feedback signal passed on a first feedback path, and configured to error-correct said input signal indicative of the magnetic signal via a second feedback signal passed on a second feedback path, the second feedback path different from the first feedback path;
a second processing block configured to receive a signal indicative of a gyroscopic signal from a gyroscopic sensor and configured to generate a gyroscopic quaternion; and
a combination block configured to produce an estimate of angular position by complementarily combining said geomagnetic quaternion and said gyroscopic quaternion based on a combination factor, the combination factor varying as a function of operating conditions, and the combination factor having a dynamic value and an adaptive value, wherein said combination factor has an initial value, wherein said combination factor is a function of a first variation parameter that is dependent on a linear acceleration acting on the electronic complementary filter device, and wherein said combination factor is a function of a second variation parameter that is dependent on a desired rate of convergence of said estimate of angular position to a real angular position value.

2. The electronic complementary filter device according to claim 1, wherein said combination block is configured to implement a combination expression of the type:

$$\hat{q}=K \cdot qGyro+(1-K) \cdot qAccMag$$

wherein q̂ is said estimate of angular position, qGyro is said gyroscopic quaternion, qAccMag is said geomagnetic quaternion, and K is said combination factor, wherein said combination factor has a value close to unity.

3. The electronic complementary filter device according to claim 1, wherein said first variation parameter varies as a function of said linear acceleration between a minimum value and a maximum value to cause an increase of said combination factor with respect to said initial value, and wherein said second variation parameter varies between a zero value and a maximum negative value as a function of a movement index to cause a decrease of said combination factor with respect to said initial value, said movement index indicative of a state of movement of said electronic complementary filter device.

4. The electronic complementary filter device according to claim 1, wherein said combination factor is given by an expression in the following form:

$$K=f(AL, VC)=K_0+AL+VC$$

wherein K is said combination factor, $K_0$ is said initial value, AL is said first variation parameter, and VC is said second variation parameter.

5. The electronic complementary filter device according to claim 1, further comprising:
a magnetic-anomalies handling module configured to supply to said first processing block said input signal indicative of said magnetic signal, said magnetic-anomalies handling module further configured to reduce effects of magnetic interference on said estimate of angular position, said magnetic-anomalies handling module including:
a generation stage configured to receive said magnetic signal and configured to generate said input signal by combining said magnetic signal with a reference magnetic signal coming from a virtual magnetometer, said generation stage configured to generate said input signal as a function of a magnetic combination factor, the value of said magnetic combination factor determined dynamically as a function of an error parameter, said error parameter indicative of magnetic anomalies acting on the electronic complementary filter device.

6. The electronic complementary filter device according to claim 5, wherein said magnetic-anomalies handling module further comprises:
an error-determination stage configured to generate said error parameter, said error-determination stage including:
a processing block configured to receive the magnetic signal and a gravity-acceleration signal, said processing block further configured to generate a geomagnetic gravity quaternion; and
an error-computing block configured to determine said error parameter as a function of a difference between said geomagnetic gravity quaternion and said gyroscopic quaternion.

7. The electronic complementary filter device according to claim 5, wherein said magnetic combination factor is set at a unit value, in a case where said estimate of angular position represents a game rotation vector.

8. The electronic complementary filter device according to claim 1, wherein said signal indicative of said gyroscopic signal is set at a zero value in a case where said estimate of angular position represents a geomagnetic vector.

9. The electronic complementary filter device according to claim 1, wherein said electronic complementary filter device is configured to operate recursively, wherein said second processing block is configured at each current instant (t) to receive said estimate of angular position determined at a previous instant (t-1), and wherein said second processing block is configured to generate said gyroscopic quaternion as a function also of said estimate of angular position at the previous instant (t-1).

10. A portable electronic apparatus, comprising:
an accelerometric sensor configured to produce an acceleration signal;
a magnetic-field sensor configured to produce a magnetic signal;
a gyroscopic sensor configured to produce a gyroscopic signal;
an electronic complementary filter device having:
a first processing block configured to:
receive the acceleration signal;
receive an input signal indicative of the magnetic signal;
gyroscopically adjust said input signal indicative of the magnetic signal via a first feedback signal passed on a first feedback path;
error-correct said input signal indicative of the magnetic signal via a second feedback signal passed on a second feedback path, the second feedback path different from the first feedback path; and
generate a geomagnetic quaternion;
a second processing block configured to:
receive the signal indicative of a gyroscopic signal; and
generate a gyroscopic quaternion; and
a combination block configured to:
receive a combination factor having a dynamic value and an adaptive value, wherein the combination factor varies as a function of operating conditions, wherein said combination factor has an initial value, wherein said combination factor is a function of a first variation parameter that is dependent on a linear acceleration acting on the electronic complementary filter device, and wherein said combination factor is a function of a second variation parameter that is dependent on a desired rate of convergence of an estimate of angular position to a real angular position value; and
produce said estimate of angular position by complementarily combining said geomagnetic quaternion and said gyroscopic quaternion based on the combination factor; and
a management unit coupled to the electronic complementary filter device for receiving said estimate of angular position.

11. The portable electronic device according to claim 10, wherein said portable electronic device is a wearable electronic device.

12. The portable electronic device according to claim 10, wherein said accelerometric sensor, said magnetic-field sensor, and said gyroscopic sensor each provide signals along three axes.

13. The portable electronic device according to claim 12, wherein said accelerometric sensor, said magnetic-field sensor, and said gyroscopic sensor each follow a North East Down orientation.

14. The portable electronic device according to claim 10, wherein said estimate of angular position is produced using only said acceleration signal and one of said input signal indicative of the magnetic signal and said signal indicative of a gyroscopic signal.

15. A method to determine an estimate of angular position, comprising:
receiving a combination factor having a dynamic value and an adaptive value, the combination factor varying as a function of operating conditions of an electronic device, wherein said combination factor has an initial value, wherein said combination factor is a function of a first variation parameter that is dependent on a linear acceleration acting on the electronic device, and wherein said combination factor is a function of a second variation parameter that is dependent on a desired rate of convergence of said estimate of angular position to a real angular position value;
in response to receiving an input signal indicative of a magnetic signal;
gyroscopically adjusting said input signal indicative of the magnetic signal via a first feedback signal passed on a first feedback path;
error-correcting said input signal indicative of the magnetic signal via a second feedback signal passed on a second feedback path, the second feedback path different from the first feedback path; and
generating a geomagnetic quaternion from a received acceleration signal and from said input signal indicative of said magnetic signal;
if said input signal indicative of the magnetic signal is not received, generating the geomagnetic quaternion from said received acceleration signal;
in response to receiving a signal indicative of a gyroscopic signal, generating a gyroscopic quaternion;
based on said generation of the gyroscopic quaternion, complementarily combining said geomagnetic quaternion and said gyroscopic quaternion based on the combination factor to determine said estimate of angular position; and
if said gyroscopic quaternion is not generated, filtering said geomagnetic quaternion based on the combination factor to determine said estimate of angular position.

16. The method according to claim 15, wherein when said gyroscopic quaternion is generated, complementarily combining implements a combination expression in the following form:

$$\hat{q} = K \cdot qGyro + (1-K) \cdot qAccMag$$

wherein $\hat{q}$ is said estimate of angular position, qGyro is said gyroscopic quaternion, qAccMag is said geomagnetic quaternion, and K is said combination factor, wherein said combination factor has a value close to unity.

17. The method according to claim 15, wherein said first variation parameter varies as a function of said linear acceleration between a minimum value and a maximum value to cause an increase of said combination factor with respect to said initial value, and wherein said second variation parameter varies between a zero value and a maximum negative value as a function of a movement index to cause a decrease of said combination factor with respect to said initial value, said movement index indicative of a state of movement of said electronic device.

* * * * *